C. F. JENKINS.
MOVING PICTURE APPARATUS.
APPLICATION FILED APR. 22, 1911.
1,083,016.
Patented Dec. 30, 1913.
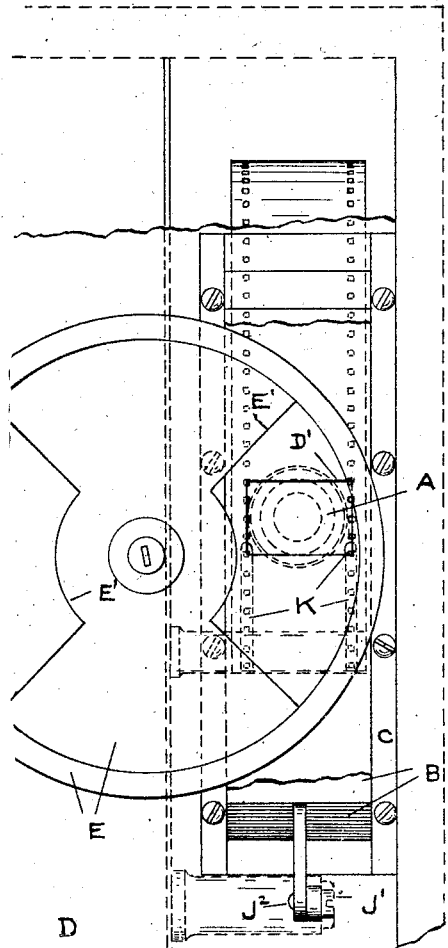
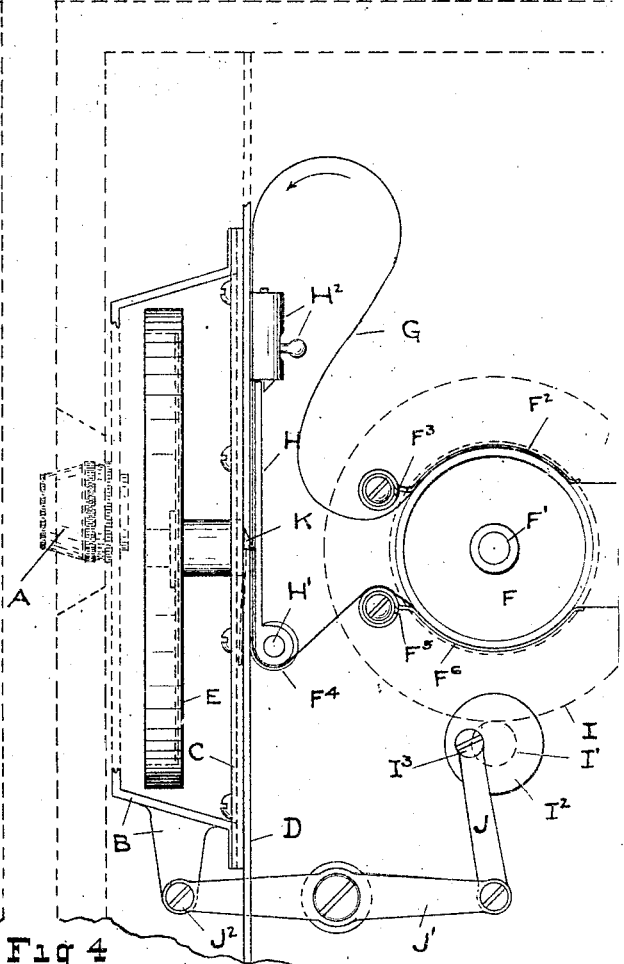
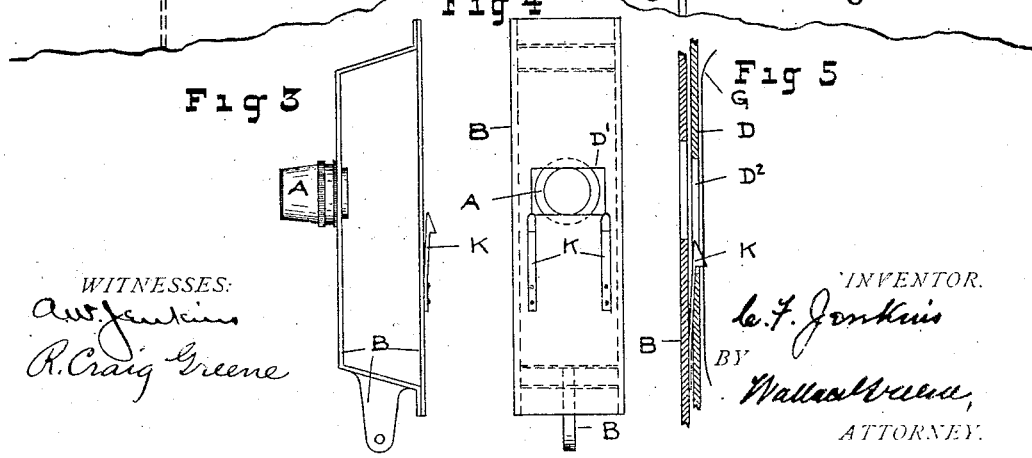
WITNESSES:
INVENTOR.
C. F. Jenkins
BY
ATTORNEY.

UNITED STATES PATENT OFFICE.

CHARLES FRANCIS JENKINS, OF WASHINGTON, DISTRICT OF COLUMBIA, ASSIGNOR, BY MESNE ASSIGNMENTS, TO LAEMMLE MANUFACTURING COMPANY, A CORPORATION OF NEW YORK.

MOVING-PICTURE APPARATUS.

1,083,016.   Specification of Letters Patent.   Patented Dec. 30, 1913.

Application filed April 22, 1911. Serial No. 622,751.

*To all whom it may concern:*

Be it known that I, CHARLES FRANCIS JENKINS, a citizen of the United States, residing at Washington, in the District of Columbia, have invented certain new and useful Improvements in Moving-Picture Apparatus, of which the following is a specification, reference being had therein to the accompanying drawing.

My invention relates to moving picture apparatus and especially to means for securing the desired exposure of successive portions of the film.

It has long been common to move the film past the lens axis or light opening intermittently, forming or projecting each picture during an interval of rest, but since there are usually from sixteen to twenty movements per second, the starting and stopping must be so sudden as to put undesirable strain upon the film and mechanism. Further, the different mechanisms employed must be made with great accuracy or their movements will not be properly coördinated, and with many constructions noise and wear are objectionable.

The general object of this invention is to avoid these evils and at the same time to simplify the apparatus and secure more perfect and satisfactory results. This object is attained by moving the lens member during the exposure intervals and causing it and the film to move correspondingly so that both temporarily advance as one whole although moving somewhat independently during intermediate periods.

In the accompanying drawings, Figure 1 is a front view of so much of a camera as is necessary to an understanding of the invention. Fig. 2 is a side view of the mechanism of Fig. 1. Figs. 3, 4 and 5 show certain devices detached.

In these figures, A represents a lens mounted in a frame B arranged to slide vertically in suitable ways C upon a plate D forming a part of the ordinary camera box or casing and having the usual light opening at D'. Light from the lens is interrupted at intervals by a rotary shutter E having in this instance two diametrically opposite apertures E'. Upon the opposite side of the plate D is a rotary film-carrying sprocket drum F mounted upon a constantly rotating shaft F'. Film G passing toward the point of exposure is held down upon the drum by a light spring $F^2$ and from the drum it passes around a roller $F^3$ and in loop form to a guide H hinged at H' and provided with a catch at $H^2$, this guide being adapted to hold the film accurately in place and in plane form as it passes the exposure aperture. As the film comes from the guide it passes around suitable rollers $F^4$, $F^5$ and again into engagement with the lower side of the same drum, where it is pressed into contact by a second spring $F^6$. Obviously the two feeds will be at precisely equal speeds, and were there no other devices the loop or slack above must remain constant. The drum shaft bears a gear I which meshes with a pinion, I', upon the shaft of which is fixed a crank plate $I^2$ bearing a wrist pin $I^3$ which is connected by a pitman J, centrally pivoted lever J' and pivotal connection at $J^2$, with the lens frame B.

From the construction it follows that as the drum is rotated the lens frame rises and falls, the motion ceasing when the wrist pin is at its highest or lowest point and gradually accelerating its motion as the wrist pin approaches a point midway between its highest and lowest positions and again gradually lessening its speed until the wrist pin again reaches its lowest or highest position. The lever and frame constitute a lens member which is thus caused to slide back and forth in its ways while parallel to that portion of the film retained by the guide and but a slight distance in front of the same. To the back of the frame are fixed two light spring hooks K normally projecting from said frame through slots $D^2$ in the plate D. These hooks are adapted to engage in the film perforations and pull the film when they move downward faster than the film but are beveled upwardly away from the film so that in moving upwardly they do not engage but are pushed outward by the film itself.

When the lens frame reaches its highest point, the hooks engage, usually entering centrally the perforations in the moving film and immediately starting downward with a slow motion which is rapidly accelerated as the wrist-pin moves toward the horizontal plane through the center of the crank plate. The parts are so proportioned that the drum moves the film much slower than the lens frame advances in the middle part of its path and hence the descending hooks engage the film and starting slowly quickly acquire a speed above that of the film and pull the film onward, some of the slack in the loop above the guide passing to that portion below the guide. The motion of the hooks is then gradually reduced as they approach their lower limit. Their rate of motion falling below the normal rate of the film, even were there no slack below to be taken up, no harm would result since the film acting on the inclines of the hooks would push the latter back and pass on. When the hooks ascend they slip over the film and readily pass its apertures, and the shutter is so proportioned and timed that exposure is made only while the lens and the film are moving as one. It is only of moment that the full cycle of the lens movement be completed in proper time, the rate of movement at any point of time and uniformity of rate being immaterial. Usually the slack formed below the film guide is taken up before the hooks cease to pull the film downward, so that the film never ceases to move downward at the exposure opening, although it is not continuously drawn by the sprocket drum.

What I claim is:

In a kinetoscopic apparatus, the combination of a film support, a carrier, means for reciprocating said carrier in relation to said support, the same comprising a lever connected at one end to the carrier, an operating crank pin carried by the driving mechanism of the apparatus connected to the other end of the lever, an objective mounted on said carrier, and mechanism for feeding the film at substantially the same speed as the lens during exposure.

In testimony whereof I affix my signature in presence of two witnesses.

CHARLES FRANCIS JENKINS.

Witnesses:
  JAMES L. CRAWFORD,
  R. CRAIG GREENE.